US012776501B2

(12) United States Patent
Iguchi

(10) Patent No.: US 12,776,501 B2
(45) Date of Patent: Oct. 27, 2026

(54) POWER SUPPLY SYSTEM, CONTROL METHOD, AND PROGRAM

(71) Applicant: HONDA MOTOR CO., LTD., Tokyo (JP)

(72) Inventor: Tsuyoshi Iguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 18/180,155

(22) Filed: Mar. 8, 2023

(65) Prior Publication Data

US 2023/0317989 A1 Oct. 5, 2023

(30) Foreign Application Priority Data

Mar. 31, 2022 (JP) ................................. 2022-059346

(51) Int. Cl.
*H01M 8/04302* (2016.01)
*H01M 8/04537* (2016.01)
*H01M 8/04858* (2016.01)

(52) U.S. Cl.
CPC ... *H01M 8/04552* (2013.01); *H01M 8/04302* (2016.02); *H01M 8/04873* (2013.01); *H01M 8/04902* (2013.01)

(58) Field of Classification Search
CPC ........................ H01M 8/04223–04225; H01M 8/04298–04302; H01M 8/04305–04313;
(Continued)

(56) References Cited

U.S. PATENT DOCUMENTS

2007/0275276 A1* 11/2007 Saeki ................ H01M 8/04559 429/432
2008/0182143 A1* 7/2008 Dong .................... H01M 8/249 429/432
(Continued)

FOREIGN PATENT DOCUMENTS

CN 103477527 12/2013
CN 107925099 4/2018
(Continued)

OTHER PUBLICATIONS

Machine translation of Lee, KR 2015-0077556. Originally available Jul. 8, 2015. (Year: 2015).*
(Continued)

*Primary Examiner* — Nicole M. Buie-Hatcher
*Assistant Examiner* — Jacob Buchanan
(74) *Attorney, Agent, or Firm* — Amin, Turocy & Watson, LLP

(57) ABSTRACT

A power supply system controls a voltage converter of a fuel cell output unit that has started up first among a plurality of fuel cell output units so that an output voltage of the fuel cell of the fuel cell output unit or an output voltage of the voltage converter becomes a target voltage when the plurality of fuel cell output units are controlled. Further, the system controls the voltage converter of a fuel cell output unit that has started up after the fuel cell output unit that has started up first among the plurality of fuel cell output units so that an output current of the fuel cell of the fuel cell output unit or an output current of the fuel cell output unit becomes a target current.

3 Claims, 6 Drawing Sheets

(58) Field of Classification Search
CPC ......... H01M 8/04537–04686; H01M 8/04694; H01M 8/04858–04953
See application file for complete search history.

(56) References Cited

U.S. PATENT DOCUMENTS

| | | | | |
|---|---|---|---|---|
| 2009/0162711 | A1 | 6/2009 | Fujita | |
| 2014/0049053 | A1 | 2/2014 | Inoue | |
| 2018/0175400 | A1 | 6/2018 | Ferreyra et al. | |
| 2018/0219238 | A1* | 8/2018 | Tanaka | H01M 8/04302 |
| 2018/0229622 | A1 | 8/2018 | Matsumoto | |

FOREIGN PATENT DOCUMENTS

| | | | |
|---|---|---|---|
| JP | 2006-147597 | 6/2006 | |
| JP | 2007-149392 | 6/2007 | |
| JP | 2007-287567 | 11/2007 | |
| JP | 2007-318938 | 12/2007 | |
| JP | 2009-261199 | 11/2009 | |
| JP | 2010-218691 | 9/2010 | |
| JP | 2018-142533 | 9/2018 | |
| KR | 20150077556 A * | 7/2015 | H01M 8/04955 |

OTHER PUBLICATIONS

Japanese Office Action for Japanese Patent Application No. 2022-059346 mailed Nov. 14, 2023.
Chinese Office Action for Chinese Patent Application No. 202310248261.4 mailed Aug. 29, 2026.

* cited by examiner

POWER SUPPLY SYSTEM, CONTROL METHOD, AND PROGRAM

CROSS-REFERENCE TO RELATED APPLICATION

Priority is claimed on Japanese Patent Application No. 2022-059346, filed Mar. 31, 2022, the content of which is incorporated herein by reference.

BACKGROUND OF THE INVENTION

Field of the Invention

The present invention relates to a power supply system, a control method, and a program.

Description of Related Art

In recent years, a fuel cell (FC) has been used as an emergency power supply in order to reduce adverse effects on the global environment (see, for example, Patent Document 1 (Japanese Unexamined Patent Application, First Publication No. 2007-318938)).

In a power supply system that requires high output responsiveness in order to cope with fluctuations in transient power as an emergency power supply, batteries with higher responsiveness to an FC are connected in parallel to each other to cope with fluctuations in transient power as shown in FIG. 6.

FIG. 6 is a diagram showing a configuration example in a case where a fuel cell is used as an emergency power supply. FIG. 6 shows a power supply system including a fuel cell (FC), a fuel cell voltage and current control unit (FC VCU), a battery voltage and current control unit (BAT VCU), and a battery. The FC VCU controls FC power. The BAT VCU controls battery power.

There is a power supply system that requires high output responsiveness in order to cope with fluctuations in transient power as described above, whereas there is also a power supply system that does not require high output responsiveness as stationary auxiliary/regulating power supply or ordinary power supply applications. In a case where high output responsiveness is not required, a no-battery configuration with no battery can be considered. In the case of no battery, it is possible to achieve a reduction in cost and size.

However, since a DC bus voltage is determined by the voltage of a battery, the no-battery configuration may cause the DC bus voltage to become uncertain and fall outside the input voltage range of an inverter which is an output destination of a power supply system.

The present invention was contrived in view of such circumstances, and one object thereof is to provide a technique of stabilizing a voltage even without a battery.

SUMMARY OF THE INVENTION

The following configurations are adopted in a power supply system according to this invention.

(1) According to an aspect of this invention, a power supply system is provided configured with a plurality of fuel cell output units, each having a fuel cell and a voltage converter that converts an output voltage of the fuel cell, connected in parallel to a load, the system including: detectors that detect output voltages of the voltage converters of the plurality of fuel cell output units; and a controller that controls the plurality of fuel cell output units based on the output voltages detected by the detectors, wherein the controller controls the voltage converter of a fuel cell output unit that has started up first among the plurality of fuel cell output units so that the output voltage of the fuel cell of the fuel cell output unit or the output voltage of the voltage converter becomes a target voltage when the plurality of fuel cell output units are controlled, and controls the voltage converter of a fuel cell output unit that has started up after the fuel cell output unit that has started up first among the plurality of fuel cell output units so that an output current of the fuel cell of the fuel cell output unit or an output current of the fuel cell output unit becomes a target current.

(2) In the power supply system according to the aspect of the above (1), the controller may determine that the fuel cell output unit has started up in a case where the output voltage detected by the detector is equal to or higher than a predetermined threshold.

(3) According to an aspect of this invention, a control method is provided controlling a plurality of fuel cell output units based on output voltages detected by detectors in a power supply system configured with the plurality of fuel cell output units, each having a fuel cell and a voltage converter that converts an output voltage of the fuel cell, connected in parallel to a load and including the detectors that detect output voltages of the voltage converters of the plurality of fuel cell output units, the method including causing one or more computers to: control the voltage converter of a fuel cell output unit that has started up first among the plurality of fuel cell output units so that the output voltage of the fuel cell of the fuel cell output unit or the output voltage of the voltage converter becomes a target voltage when the plurality of fuel cell output units are controlled; and control the voltage converter of a fuel cell output unit that has started up after the fuel cell output unit that has started up first among the plurality of fuel cell output units so that an output current of the fuel cell of the fuel cell output unit or an output current of the fuel cell output unit becomes a target current.

(4) According to an aspect of this invention, a program is provided for controlling a plurality of fuel cell output units based on output voltages detected by detectors in a power supply system configured with the plurality of fuel cell output units, each having a fuel cell and a voltage converter that converts an output voltage of the fuel cell, connected in parallel to a load and including the detectors that detect output voltages of the voltage converters of the plurality of fuel cell output units, the program causing one or more computers to: control the voltage converter of a fuel cell output unit that has started up first among the plurality of fuel cell output units so that the output voltage of the fuel cell of the fuel cell output unit or the output voltage of the voltage converter becomes a target voltage when the plurality of fuel cell output units are controlled; and control the voltage converter of a fuel cell output unit that has started up after the fuel cell output unit that has started up first among the plurality of fuel cell output units so that an output current of the fuel cell of the fuel cell output unit or an output current of the fuel cell output unit becomes a target current.

According to the aspects of (1) to (4), it is possible to stabilize a voltage even without a battery by causing one fuel cell output unit to control the voltage.

DETAILED DESCRIPTION OF THE INVENTION

Hereinafter, an embodiment of a power supply system, a control method, and a program of the present invention will be described with reference to the accompanying drawings.

Figure 1:
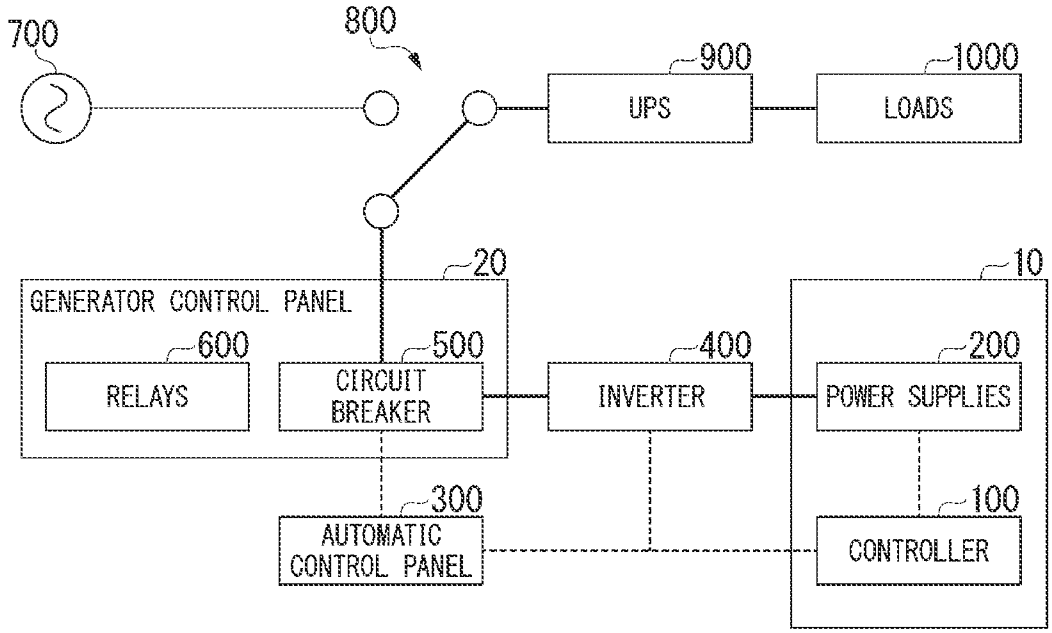
FIG. 1 is a diagram showing a configuration example including a power supply system 10 according to an embodiment.

FIG. 1 is a diagram showing a configuration example including a power supply system 10 according to an embodiment of the present invention. The power supply system 10 shown in FIG. 1 is a power supply system which is used for stationary auxiliary/regulating power supply or ordinary power supply applications. Therefore, it is a power supply system that does not require high output responsiveness.

FIG. 1 shows the power supply system 10, an inverter 400, a generator control panel 20, a GRID 700, a switching unit 800, an uninterruptible power supply (UPS) 900, and loads 1000. In FIG. 1, solid lines indicate electric power lines and broken lines indicate communication lines. A controller area network (CAN) is a communication protocol in a case where communication is performed using a communication line.

The power supply system 10 supplies electric power to the load as an auxiliary power supply at nighttime or the like, for example, instead of the GRID 700. The inverter 400 converts DC power output from the power supply system 10 to AC power. The generator control panel 20 includes a circuit breaker 500 and relays 600. The circuit breaker 500 switches the source of supply of electric power to the load between the GRID 700 and the power supply system 10 using the switching unit 800 under control of an automatic control panel 300. The relays 600 are constituted by, for example, a frequency relay, an overcurrent relay, an overvoltage/undervoltage relay, a ground fault detection relay, and the like.

The automatic control panel 300 controls the power supply system 10, the inverter 400, and the generator control panel 20. The GRID 700 is an electric power system such as an electric power company that supplies electric power to the loads 1000. The UPS temporarily supplies electric power to the loads 1000 in a case where the supply of electric power to the loads 1000 is cut off.

The power supply system 10 includes a controller 100 and power supplies 200.

The controller 100 controls the power supplies 200. The power supplies 200 supply electric power using a fuel cell. The power supply system 10 is provided with various auxiliary machines related to the power supplies 200, a battery for operating the auxiliary machines, and a supply mechanism that supplies hydrogen to the power supplies 200 under control of the automatic control panel 300, which are omitted in the drawing.

Figure 2:
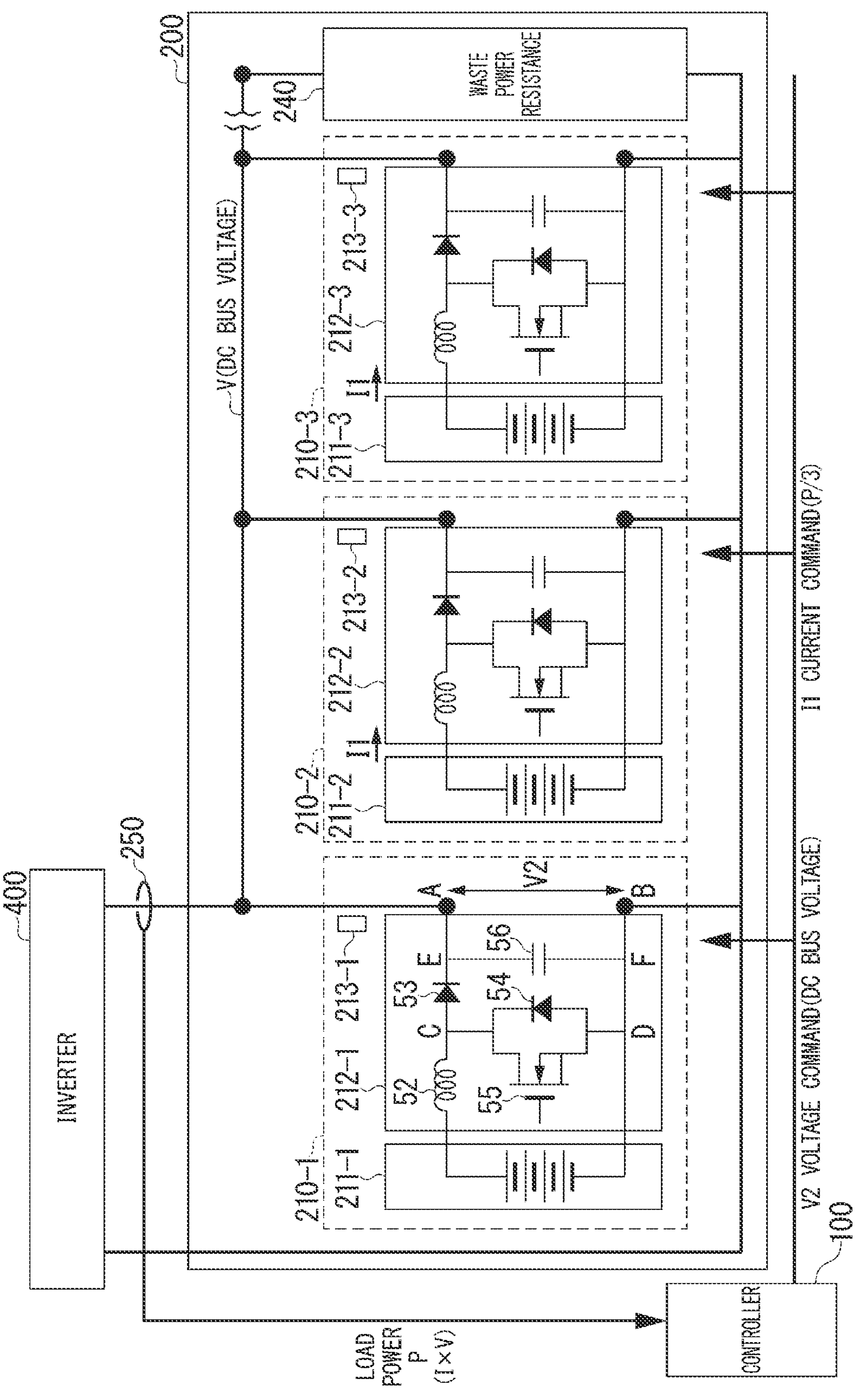
FIG. 2 is a diagram showing a configuration example of power supplies 200.

FIG. 2 is a diagram showing a configuration example of the power supplies 200. The power supplies 200 are constituted by three fuel cell stacks (FCSs) 210-1, 210-2, and 210-3, a waste power resistance 240, and a current sensor 250. In a case where the FCSs 210-1, 210-2, and 210-3 need not be specifically distinguished from each other, they are referred to as the FCS 210. Although three FCSs 210 are shown as an example, the number thereof need only be plural. A command is issued to the FCS 210 from the controller 100. The FCS 210 is an example of a fuel cell output unit.

The FCSs 210-1, 210-2, and 210-3 are connected in parallel to the load. The waste power resistance 240 is connected in parallel the FCSs. A load current I and a DC bus voltage V are output to the inverter 400.

The controller 100 uses one of the FCSs 210-1, 210-2, and 210-3 as the FCS 210 that controls a voltage. The controller 100 uses the other FCSs 210 as the FCSs 210 that control a current. In the example of FIG. 2, the FCS 210 that controls a voltage is the FCS 210-1, and the FCS 210 that controls a current is the FCSs 210-2 and 210-3.

The controller 100 issues a command (V2 voltage command) for causing the FCS 210-1 to control the secondary side voltage (hereinafter referred to as "V2") of the FCS 210-1 to the FCS 210-1. On the other hand, the controller 100 obtains load power P from the load current I and the DC bus voltage V detected by the current sensor 250 and issues a command (I1 current command) to control a current I1 (target current) for electric power P/(3 (=the number of FCSs)) to the FCSs 210-2 and 210-3. The waste power resistance 240 is a resistance for consuming electric power such that the voltage does not become too high.

Since the three FCSs 210 have the same configuration, the configuration will be described using the FCS 210-1. The FCS 210-1 is constituted by a fuel cell (FC) 211-1, a fuel cell voltage and current control unit (FC VCU) 212-1, and a detector 213-1. A resistor 52 and a diode 53 are connected in series to the positive electrode side of an FC 211-1. The cathode of the diode 53 is connected to a terminal A. The anode of the diode 53 is connected to the resistor 52. A reactor 55 and a diode 54 are connected in parallel to each other and are connected to a terminal C and a terminal D, respectively. The terminal C is provided between the resistor 52 and the diode 53. A terminal D is connected to the negative electrode side of the FC 211-1. A capacitor 56 is connected to a terminal E and a terminal F. The terminal E is connected to the cathode side of the diode 53. The terminal F is connected to the negative electrode side of the FC 211-1. The detector 213-1 detects the secondary side voltage from a potential difference between the terminals A and B of the FCS 210-1 and notifies the controller 100 of the secondary side voltage at predetermined intervals (for example, 10 ms). In the following description, in a case where the FCs 211-1 and 211-2, 211-3 need not be specifically distinguished from each other, they are referred to as the FC 211. In a case where the FC VCUs 212-1, 212-2, and 212-3 need not be specifically distinguished from each other, they are referred to as the FC VCU 212. In a case where the detectors 213-1, 213-2, and 213-3 need not be specifically distinguished from each other, they are referred to as the detector 213. The FC VCU 212 is an example of a voltage converter that converts the output voltage of the fuel cell.

As shown in FIG. 2 described above, the power supply system 10 according to the present embodiment is a power supply system in which a plurality of fuel cell output units, each having a fuel cell and a voltage converter that converts the output voltage of the fuel cell, are configured to be connected in parallel to the load.

Figure 3:
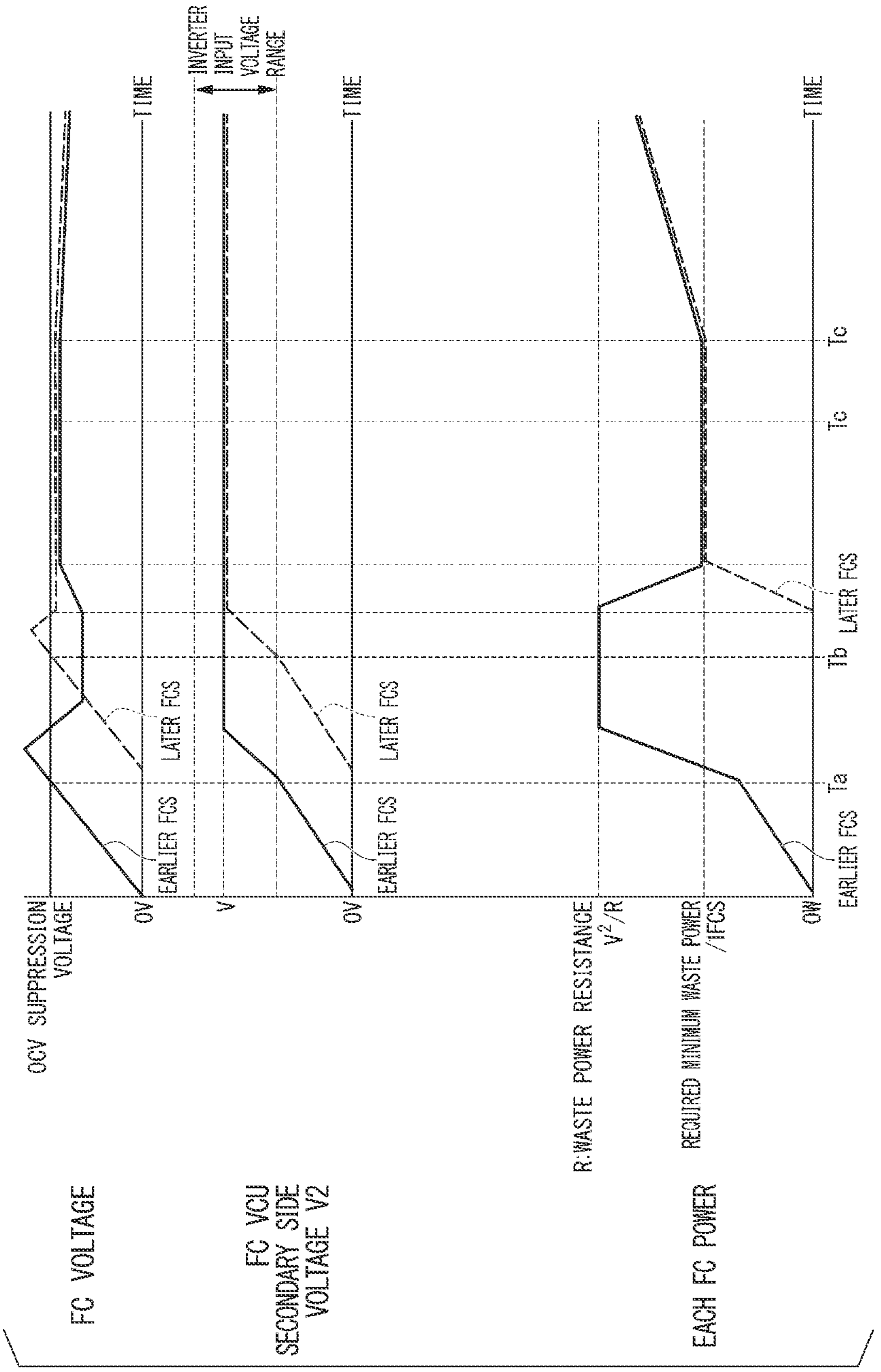
FIG. 3 is a graph showing changes in parameters.

Based on the above configuration, the details of control according to the present embodiment will be described below. FIG. 3 is a graph showing changes in parameters through control according to the present embodiment. FIG. 3 shows an FC voltage, an FC VCU secondary side voltage, and electric power of each FC 211. The FC voltage is a voltage which is output by the FC 211. The FC VCU secondary side voltage indicates a voltage which is output by the FC VCU 212. Each FC power indicates electric power which is output by each FC 211. The vertical axis of the graph showing the FC voltage and the FC VCU secondary side voltage indicates a voltage. The vertical axis of the graph showing each FC power indicates electric power.

Further, FIG. 3 shows "earlier FCS" and "later FCS." The "earlier FCS" indicates a FCS 210 that has started up first among a plurality of FCSs 210. The wording "having started up first" means a first FCS 210 of which the output voltage detected by the detector 213 is equal to or higher than a predetermined threshold among the plurality of FCSs 210. The predetermined threshold is an open circuit voltage (OCV) suppression voltage in the present embodiment. The "later FCS" is a FCS 210 that has started up later than the FCS 210 that has started up first among the plurality of fuel cell output units. That is, the "later FCS" is the FCS 210 other than the "earlier FCS." Meanwhile, the OCV suppression voltage is a voltage at which control to prevent the voltage from becoming higher than this OCV suppression voltage (hereinafter referred to as "OCV suppression control") is started. The controller 100 is periodically notified of the FC voltage detected by the detector 213 from each FCS 210. Therefore, the controller 100 determines that the FCS 210 has started up in a case where the output voltage detected by the detector 213 is equal to or higher than a predetermined threshold.

The reason why the startup timing differs depending on the FCS 210 is that variation occurs due to a difference in the fuel piping path to each FC 211 and a difference in the temperature of the FC 211.

In FIG. 3, the FC voltage of the "earlier FCS," the secondary side voltage of the FC VCU, and each FC power are shown by solid lines. The FC voltage of the "later FCS," the secondary side voltage of the FC VCU, and each FC power are shown by single dashed lines. In the case of FIG. 3, it is assumed that there are two FCSs in the power supply system. Therefore, there is also one "later FCS."

FIG. 3 shows timings Ta, Tb, Tc, and Td. The timing Ta is a timing at which OCV suppression control of the earlier FCS is started. As described above, since the earlier FCS is the first FCS 210 of which the output voltage detected by the detector 213 is equal to or higher than a predetermined threshold among the plurality of FCSs 210, the earlier FCS is not determined from the beginning, and the FCS 210 that has started up first is the earlier FCS.

The timing Tb is a timing at which OCV suppression control of the later FCS is started. The timing Tc indicates a timing at which all OCV suppression control of the earlier FCS and the later FCS is completed. The timing Td indicates a timing at which the power supply system 10 is connected to the loads 1000.

First, at the timing Ta, when there is the first FCS 210 of which the output voltage detected by the detector 213 is equal to or higher than a predetermined threshold among the plurality of FCSs 210, that FCS is set as the earlier FCS. The controller 100 starts OCV suppression control with respect to the earlier FCS. Further, the controller 100 issues a V2 voltage command to the earlier FCS, and the earlier FCS starts V2 voltage control. The V2 voltage control adjusts the voltage to V2 which is the input voltage range of the inverter 400. Thereby, the DC bus voltage V is determined. In this way, in the present embodiment, a voltage within the input voltage range of the inverter 400 is set as a target voltage, and the earlier FCS is controlled so that the output voltage of the earlier FCS becomes a target voltage. Control may be performed so that the output voltage of the FC 211 (the primary side voltage of the earlier FCS) becomes the target voltage.

Next, at the timing Tb, the FCS 210 of which the output voltage detected by the detector 213 is equal to or higher than a predetermined threshold is set as the later FCS, and the controller 100 starts suppression control with respect to the later FCS. Further, the controller 100 issues an I1 current command to the later FCS based on the determined DC bus voltage V, and the later FCS starts I1 current control. The I1 current control is control for setting the output current of the FC 211 to I1. In this way, in the present embodiment, the later FCS is controlled so that the output current of the FC 211 becomes a target current I1. Control may be performed so that the output current of the later FCS becomes the target current.

When OCV suppression control is completed in all the FCSs 210 (timing Tc), the power supply system 10 is connected to the loads 1000 by the switching unit 800 at the timing Td. Thereby, the power supply system 10 starts to supply electric power to the load.

Figure 4:
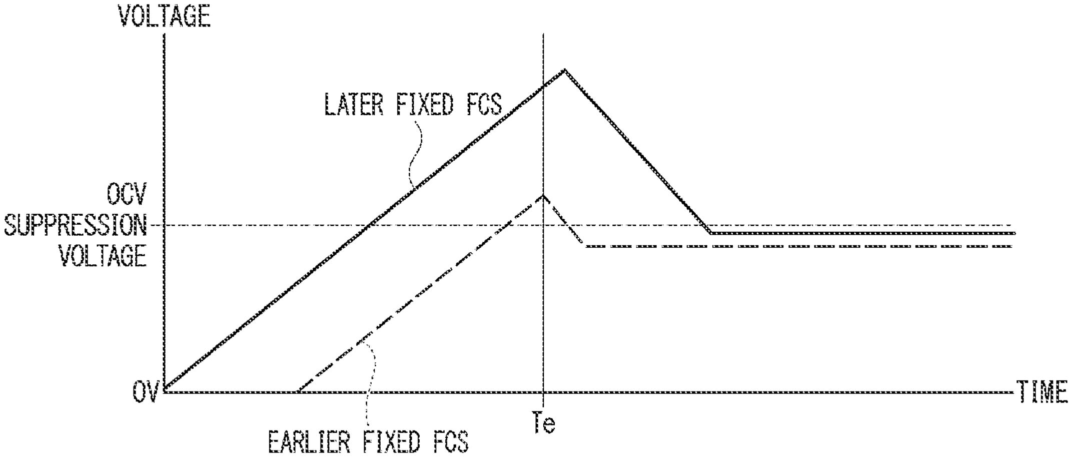
FIG. 4 is a diagram showing the possibility of overvoltage occurrence.

In a case where the earlier FCS and the later FCS are determined in advance instead of in the order of startup, there is a possibility of overvoltage occurrence. FIG. 4 is a diagram showing voltages of an earlier fixed FCS fixed in advance as the earlier FCS and a later fixed FCS fixed in advance as the later FCS. As shown in FIG. 4, even when the later fixed FCS becomes equal to or higher than the OCV suppression voltage, the OCV suppression control is not performed until the later fixed FCS becomes equal to or higher than the OCV suppression voltage (timing Te). In this case, as shown in FIG. 4, the voltage of the later fixed FCS may rise and thus there is a possibility of overvoltage occurrence. Consequently, as in the present embodiment, determination is made in the order of startup, and thus it is possible to prevent an overvoltage from occurring by performing the V2 voltage control in the first FCS 210 of which the output voltage detected by the detector 213 is equal to or higher than a predetermined threshold among the plurality of FCSs 210.

Figure 5:
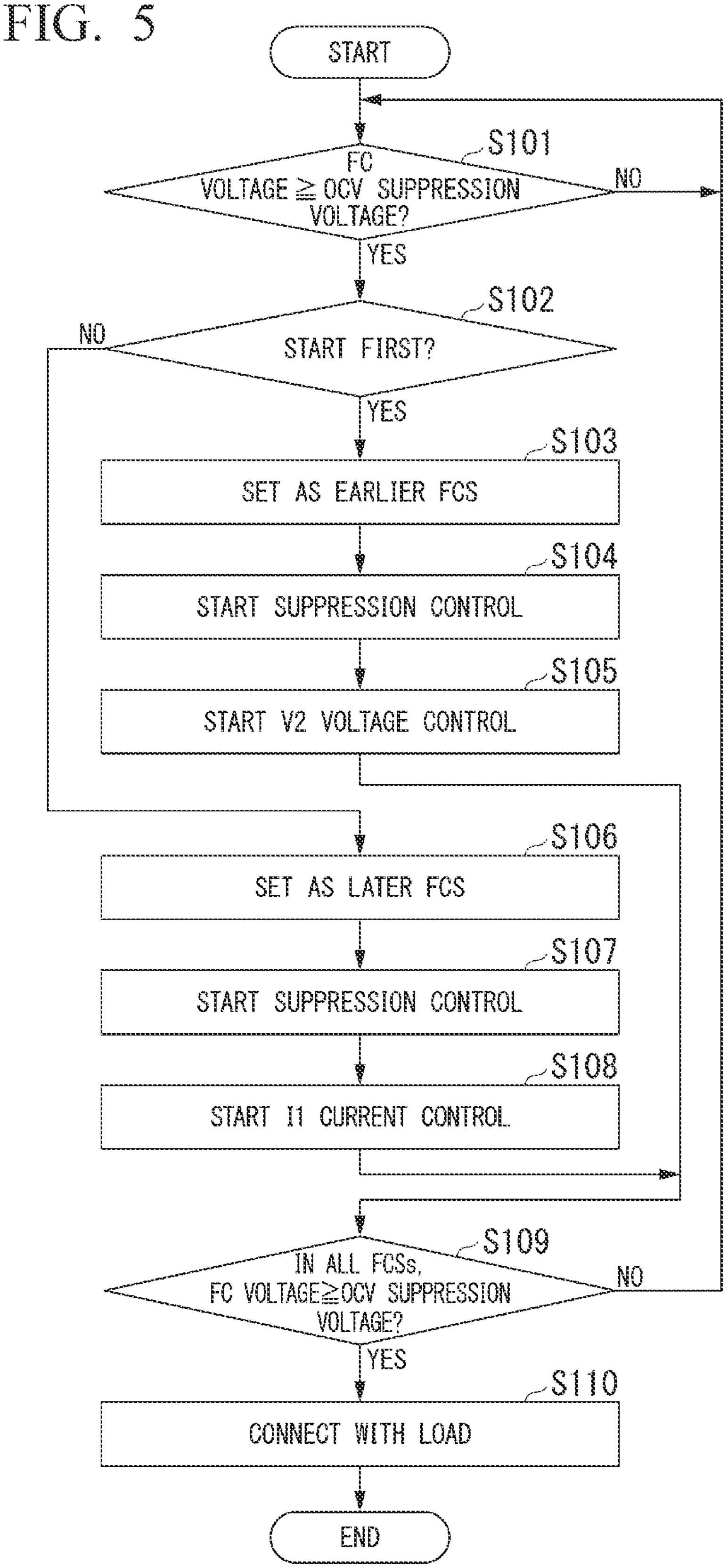
FIG. 5 is a flowchart showing the details of control performed by a controller 100.
Figure 6:
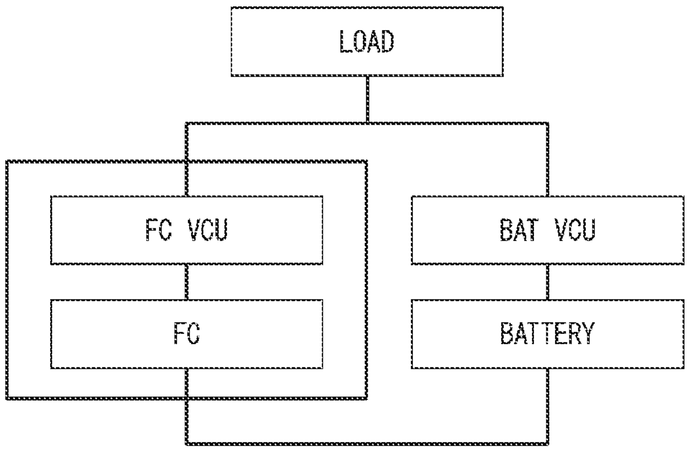
FIG. 6 is a diagram showing a configuration example of the related art.

The control described above will be described with reference to a flowchart. FIG. 5 is a flowchart showing the details of control performed by the controller 100. This flowchart shows processing from the timing Ta. The flowchart shown in FIG. 5 shows a flow of processing in a configuration in which N FCSs 210 are provided.

In FIG. 5, the controller 100 determines whether the FC voltage of any of the N FCSs 210 has become equal to or higher than the OCV suppression voltage (step S101). Here, since the controller 100 is periodically notified of the FC voltage detected by the detector 213 from the N FCSs 210, the controller uses this FC voltage to make a determination in step S101. Meanwhile, as described above, the FC voltage of the FCS 210 becoming equal to or higher than the OCV suppression voltage involves the FCS 210 having started up.

In a case where it is determined in step S101 that the FC voltage of the FCS 210 has become equal to or higher than the OCV suppression voltage, the controller 100 determines whether the FCS 210 of which the FC voltage is determined to have become equal to or higher than the OCV suppression voltage is the FCS 210 that has started up first (step S102). In a case where the FCS 210 of which the FC voltage is determined to have become equal to or higher than the OCV suppression voltage in step S102 is the FCS 210 that has started up first, the controller 100 sets this the FCS 210 as the earlier FCS (step S103).

The controller 100 starts suppression control with respect to the FCS 210 set as the earlier FCS (step S104), starts the V2 voltage control (step S105), and proceeds to step S109. In a case where the FCS 210 of which the FC voltage is determined to have become equal to or higher than the OCV suppression voltage is not the FCS 210 that has started up first in step S102, the controller 100 sets this FCS 210 as the later FCS (step S106). The controller 100 starts suppression control with respect to the FCS 210 set as the later FCS (step S107), starts the I1 current control (step S108), and proceeds to step S109.

In a case where the FC voltages of all the N FCSs 210 are not equal to or higher than the OCV suppression voltage in step S109, the controller 100 returns to step S101. In a case where the FC voltages of all the N FCSs 210 are equal to or higher than the OCV suppression voltage in step S109, the controller 100 requests the automatic control panel 300 to switch the switching unit 800. Thereby, the power supply system 10 is connected with the loads 1000 (step S110), and the process ends. The automatic control panel 300 requested to switch the switching unit 800 requests the circuit breaker 500 to switch the switching unit 800, and thus a connection destination is switched by the switching unit 800.

As described above, according to the present embodiment, it is possible to stabilize a voltage even without a battery by causing one fuel cell output unit to control the voltage. Since a battery is no longer needed, it is possible to reduce the cost and size of the power supply system 10. Further, it is possible to prevent the overvoltage of the FCs 211 connected in parallel to each other due to deviation between the startup timings of the FCs 211 and to prevent deterioration thereof.

The above-described embodiment can be represented as follows.

A power supply system configured with a plurality of fuel cell output units, each having a fuel cell and a voltage converter that converts an output voltage of the fuel cell, connected in parallel to a load and including detectors that detect output voltages of the voltage converters of the plurality of fuel cell output units, the system comprising:

a storage medium having computer-readable instructions stored therein; and a processor connected to the storage medium, wherein the processor executes the computer-readable instructions to control the voltage converter of a fuel cell output unit that has started up first among the plurality of fuel cell output units so that the output voltage of the fuel cell of the fuel cell output unit or the output voltage of the voltage converter becomes a target voltage when the plurality of fuel cell output units are controlled, and control the voltage converter of a fuel cell output unit that has started up after the fuel cell output unit that has started up first among the plurality of fuel cell output units so that an output current of the fuel cell of the fuel cell output unit or an output current of the fuel cell output unit becomes a target current.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES

10 Power supply system
20 Generator control panel
52 Resistor
53, 54 Diode
55 Reactor
56 Capacitor
100 Controller
200 Power supplies
210, 210-1, 210-2, 210-3 FCS
211, 211-1, 211-2, 211-3 FC
212, 212-1, 212-2, 212-3 FC VCU
250 Current sensor
300 Automatic control panel
400 Inverter
500 Circuit breaker
600 Relays
800 Switching unit
900 UPS
1000 Load

What is claimed is:

1. A power supply system configured with a plurality of fuel cell output units, each having a fuel cell and a voltage converter that converts an output voltage of the fuel cell, connected in parallel to a load, the power supply system comprising:

detectors that detect secondary-side output voltages of the voltage converters of the plurality of fuel cell output units; and a controller that controls the plurality of fuel cell output units based on the secondary-side output voltages detected by the detectors, wherein the controller controls the voltage converter of an earlier fuel cell output unit that has started up first among the plurality of fuel cell output units so that the output voltage of the fuel cell of the earlier fuel cell output unit or the secondary-side output voltage of the voltage converter becomes a target voltage when the plurality of fuel cell output units are controlled, controls the voltage converter of a later fuel cell output unit that has started up after the earlier fuel cell output unit so that an output current of the later fuel cell output unit becomes a target current, and wherein the controller determines that a first fuel cell output unit whose secondary side output voltage detected by a detector of the detectors is equal to or higher than a predetermined threshold is the earlier fuel cell output unit.

2. A control method of controlling a plurality of fuel cell output units based on output voltages detected by detectors in a power supply system configured with the plurality of fuel cell output units, each having a fuel cell and a voltage converter that converts an output voltage of the fuel cell, connected in parallel to a load and including the detectors that detect secondary-side output voltages of the voltage converters of the plurality of fuel cell output units, the control method comprising causing one or more computers to:

control the voltage converter of an earlier fuel cell output unit that has started up first among the plurality of fuel cell output units so that the output voltage of the fuel cell of the earlier fuel cell output unit or the secondary-side output voltage of the voltage converter becomes a target voltage when the plurality of fuel cell output units are controlled;

control the voltage converter of a later fuel cell output unit that has started up after the earlier fuel cell output so that an output current of the later fuel cell output unit becomes a target current, and wherein the control method further comprises causing the one or more computers to determine that a first fuel cell output unit whose secondary side output voltage detected by a detector of the detectors is equal to or higher than a predetermined threshold is the earlier fuel cell output unit.

3. A system comprising a storage medium having computer readable instructions stored thereon and a processor connected to the storage medium, wherein the processor executes the program for controlling a plurality of fuel cell output units based on output voltages detected by detectors in a power supply system configured with the plurality of fuel cell output units, each having a fuel cell and a voltage converter that converts an output voltage of the fuel cell, connected in parallel to a load and including the detectors that detect the secondary side output voltages of the voltage converters of the plurality of fuel cell output units, the program causing one or more computers to:

control the voltage converter of an earlier fuel cell output unit that has started up first among the plurality of fuel cell output units so that the output voltage of the fuel cell of the earlier fuel cell output unit or the secondary side output voltage of the voltage converter becomes a target voltage when the plurality of fuel cell output units are controlled;

control the voltage converter of a later fuel cell output unit that has started up after the earlier fuel cell output unit so that an output current of the later fuel cell output unit becomes a target current, and the program further causing the one or more computers to determine that a first fuel cell output unit whose secondary side output voltage detected by a detector of the detectors is equal to or higher than a predetermined threshold is the earlier fuel cell output unit.

* * * * *